(12) United States Patent
Suwa et al.

(10) Patent No.: US 7,616,402 B2
(45) Date of Patent: Nov. 10, 2009

(54) RECORDING DISK DRIVE HAVING SHROUD

(75) Inventors: Masaya Suwa, Kawasaki (JP);
Yoshiharu Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 10/893,351

(22) Filed: Jul. 19, 2004

(65) Prior Publication Data
US 2005/0185324 A1 Aug. 25, 2005

(30) Foreign Application Priority Data
Feb. 23, 2004 (JP) ............................ 2004-046834

(51) Int. Cl.
*G11B 33/14* (2006.01)

(52) U.S. Cl. .............. 360/97.02; 360/97.01; 360/97.03; 360/98.01

(58) Field of Classification Search .............. 360/98.01, 360/97.01–97.03
See application file for complete search history.

(56) References Cited

U.S. PATENT DOCUMENTS

| | | | | |
|---|---|---|---|---|
| 4,282,554 | A * | 8/1981 | Ho et al. ................... | 360/97.02 |
| 4,581,668 | A * | 4/1986 | Campbell ..................... | 369/72 |
| 5,012,365 | A * | 4/1991 | Yokoyama ............... | 360/97.03 |
| 5,696,649 | A | 12/1997 | Boutaghou | |
| 5,898,545 | A * | 4/1999 | Schirle ..................... | 360/254.7 |
| 6,125,003 | A * | 9/2000 | Tsuda et al. ............. | 360/97.03 |
| 6,208,484 | B1 * | 3/2001 | Voights ..................... | 360/97.02 |
| 6,487,038 | B1 | 11/2002 | Izumi et al. | |
| 6,560,066 | B2 * | 5/2003 | Imai et al. ................. | 360/97.02 |
| 6,600,625 | B1 * | 7/2003 | Munninghoff et al. ... | 360/97.02 |
| 6,628,475 | B2 * | 9/2003 | Nakamoto et al. ....... | 360/97.02 |
| 6,728,062 | B1 * | 4/2004 | Ou-Yang et al. ......... | 360/97.02 |
| 6,882,501 | B2 * | 4/2005 | Machcha et al. ......... | 360/97.03 |
| 6,903,899 | B2 | 6/2005 | Sakata et al. ............. | 360/97.03 |
| 2002/0063991 | A1 * | 5/2002 | Machcha et al. ......... | 360/97.03 |
| 2002/0071202 | A1 * | 6/2002 | Myokan et al. .......... | 360/97.02 |

(Continued)

FOREIGN PATENT DOCUMENTS

JP       53-57009      5/1978

(Continued)

OTHER PUBLICATIONS

Office Action dated Jul. 9, 2008.

*Primary Examiner*—Andrea L Wellington
*Assistant Examiner*—Carlos E Garcia
(74) *Attorney, Agent, or Firm*—Kratz, Quintos & Hanson, LLP

(57) ABSTRACT

A first shroud and a second shroud are opposed to the peripheral end surface of a recording disk at a certain constant distance. The second shroud is spaced downstream from the first shroud in the direction of the rotation of the recording disk. A shroud plate is opposed to the peripheral end surface of the recording disk at a position between the first and second shrouds. The shroud plate functions as a shroud. The shroud plate serves to suppress turbulence of airflow. Vibration of the recording disk can be suppressed. Moreover, if the shroud plate is designed to extend along a virtual plane perpendicular to the rotation axis of the recording disk, the airflow is prevented from staying between the first and second shrouds. The airflow can effectively be taken out. The airflow can effectively be utilized.

6 Claims, 4 Drawing Sheets

U.S. PATENT DOCUMENTS

| | | | |
|---|---|---|---|
| 2002/0122273 A1* | 9/2002 | Xia et al. | 360/97.03 |
| 2002/0149876 A1 | 10/2002 | Sakata et al. | 360/97.02 |
| 2002/0196581 A1* | 12/2002 | Tsang et al. | 360/97.02 |
| 2003/0151847 A1* | 8/2003 | Tsang et al. | 360/97.02 |
| 2003/0156352 A1* | 8/2003 | Voights et al. | 360/97.02 |
| 2004/0252405 A1* | 12/2004 | Sun et al. | 360/97.02 |
| 2005/0041329 A1* | 2/2005 | Chan et al. | 360/97.02 |
| 2005/0041332 A1* | 2/2005 | Chan et al. | 360/97.02 |
| 2005/0168867 A1* | 8/2005 | Miyajima | 360/97.02 |

FOREIGN PATENT DOCUMENTS

| | | |
|---|---|---|
| JP | 61198485 A * | 9/1986 |
| JP | 7-320478 | 12/1995 |
| JP | 2000-348465 | 12/2000 |
| JP | 2002-313061 | 10/2002 |
| JP | 2004-152373 | 5/2004 |

* cited by examiner

RECORDING DISK DRIVE HAVING SHROUD

BACKGROUND OF THE INVENTION

1. Field of the Invention

The present invention relates to a recording disk drive such as a hard disk drive (HDD). In particular, the invention relates to a recording disk drive comprising: a recording disk; and a shroud designed to face the peripheral end surface of the recording disk at a certain distance.

2. Description of the Prior Art

A shroud is located at a location outside a magnetic recording disk in a hard disk drive (HDD), for example. A shroud surface is defined in the shroud so as to face the peripheral end surface of the magnetic recording disk at a certain distance. The shroud surface is defined along a predetermined cylindrical space. When the magnetic recording disk rotates, airflow is generated along the surface of the magnetic recording disk. The shroud surface serves to suppress turbulence of the airflow.

The shroud breaks at a range of the swinging movement of a head actuator. The break of the shroud induces turbulence of the airflow. The turbulence of the airflow induces vibration of the rotating magnetic recording disk. On the other hand, the airflow serves to suppress an increase in temperature in a heating component, such as an IC chip and a voice coil motor. It is therefore desired to effectively utilize the airflow induced during the rotation of the magnetic recording disk.

SUMMARY OF THE INVENTION

It is accordingly an object of the present invention to provide a recording disk drive capable of reliably suppressing vibration of a recording disk and effectively utilizing airflow. It is accordingly another object of the present invention to provide a component, to be incorporated in the recording disk drive, greatly useful to realize the aforementioned recording disk drive.

According to the present invention, there is provided a recording disk drive comprising: a recording disk; a first shroud opposed to the peripheral end surface of the recording disk at a certain constant distance; a second shroud opposed to the peripheral end surface of the recording disk at a certain constant distance, said second shroud being spaced downstream from the first shroud in the direction of the rotation of the recording disk; and a shroud plate opposed to the peripheral end surface of the recording disk at a certain constant distance at a location between the first and second shrouds, said shroud plate extending along a virtual plane perpendicular to the rotation axis of the recording disk.

Airflow is generated along the rotating recording disk. The airflow is forced to flow toward the outer periphery of the recording disk during the rotation of the recording disk. The shroud plate faces the peripheral end surface of the recording disk at a certain constant distance at a position between the first and second shrouds. The shroud plate functions as a shroud. The shroud plate serves to suppress turbulence of the airflow. Vibration of the recording disk can thus be suppressed.

Moreover, the airflow generated along the rotational recording disk is allowed to flow into a space between the first and second shrouds. The shroud plate is designed to extend along a virtual plane perpendicular to the rotation axis of the recording disk between the first and second shrouds. The airflow can be prevented from staying between the first and second shrouds. Vibration of the recording disk can be suppressed between the first and second shroud. Additionally, the airflow can effectively be taken out. The airflow can effectively be utilized.

A rectifier plate may be fixed to the second shroud so as to face a front or/and back surface of the recording disk at a certain distance in this recording disk drive. The rectifier plate serves to further suppress turbulence of the airflow. The second shroud, the shroud plate and the rectifier plate may be formed as a one-piece component. Establishment of the one-piece component serves to improve efficiency of an assembling process of the recording disk drive.

A guiding wall may be connected to the first shroud. The guiding wall may get remoter from the peripheral end surface of the recording disk at locations further downstream from the first shroud in the direction of the rotation of the recording disk. Likewise, an auxiliary guiding wall may be connected to the second shroud. The auxiliary guiding wall is designed to face the guiding wall at a distance. The guiding wall and the auxiliary guiding wall serve to effectively introduce the airflow into a space between the first and second shrouds.

The guiding wall and the auxiliary guiding wall may define an entrance of an air passage extending toward a heating component. The airflow effectively induced along the guiding wall and the auxiliary guiding wall is allowed to flow into the air passage. A large amount of the airflow is allowed to flow toward the heating component. The airflow serves to suppress an increase in temperature of the heating component.

A specific one-piece component may be provided to realize the aforementioned recording disk drive. The component comprises: an attachment member fixed to an enclosure of the recording disk drive; a shroud designed to define a shroud surface along a predetermined cylindrical space; a shroud plate designed to extend along a first plane perpendicular to the axis of the cylindrical space, said shroud plate defines the end surface along the cylindrical space; and a rectifier plate designed to extend along a second plane parallel to the first plane, said rectifier plate is designed to get into the cylindrical space.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
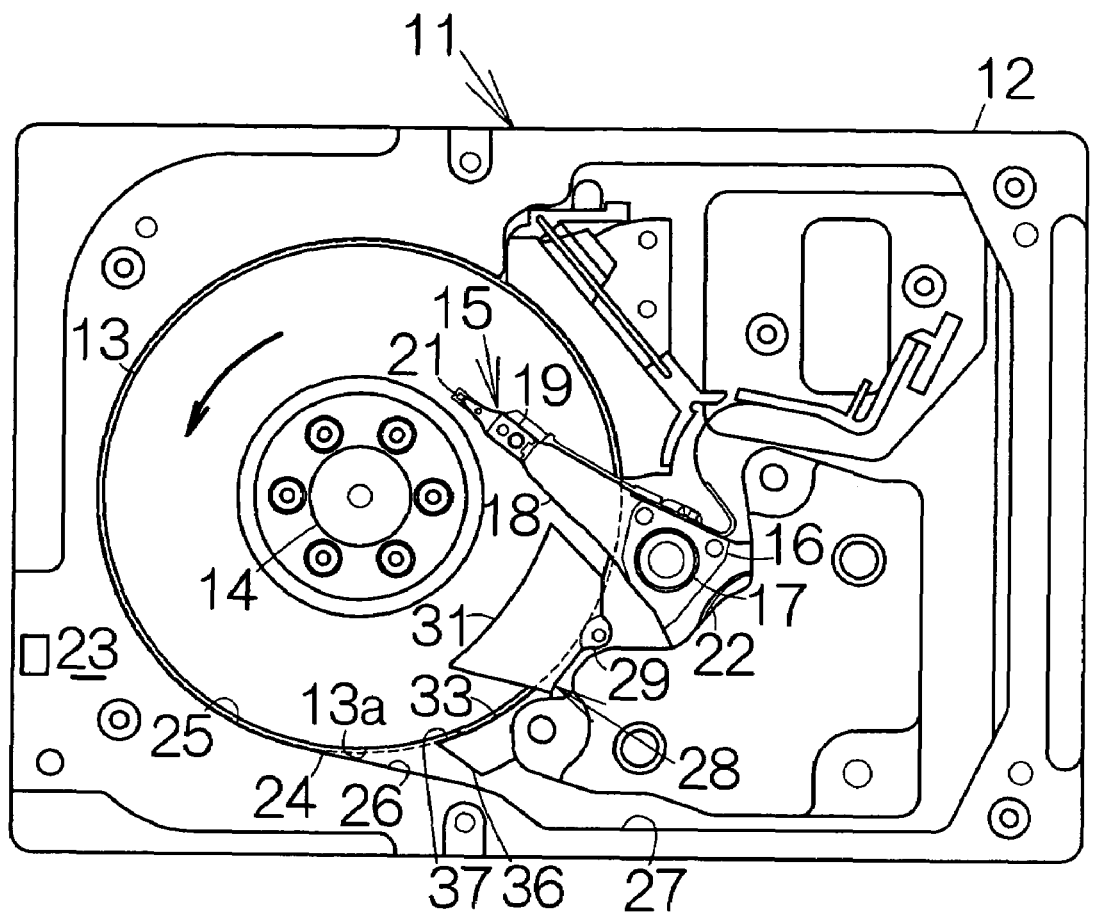
FIG. 1 is a plan view schematically illustrating the structure of a hard disk drive (HDD) as an example of a recording disk drive according to an embodiment of the present invention.

FIG. 1 schematically illustrates the inner structure of a hard disk drive (HDD) 11 as an example of a recording disk drive or storage device according to an embodiment of the present invention. The HDD 11 includes a box-shaped main enclosure 12 defining an inner space. At least one magnetic recording disk 13 is mounted on the driving shaft of a spindle motor 14 within the main enclosure 12. The spindle motor 14 is allowed to drive the magnetic recording disk 13 for rotation at a higher revolution speed such as 10,000 rpm, 15,000 rpm, or the like for example. A cover, not shown, is coupled to the main enclosure 12 so as to define the closed inner space between the main enclosure 12 and the cover itself.

A head actuator 15 is also accommodated in the inner space of the main enclosure 12. The head actuator 15 comprises an actuator block 16. The actuator block 16 is coupled to a vertical support shaft 17 for relative rotation. Rigid actuator arms 18 are defined in the actuator block 16 so as to extend in the horizontal direction from the vertical support shaft 17. The actuator block 16 may be made of aluminum. Molding process may be employed to form the actuator block 16.

Head suspensions 19 are fixed to the corresponding tip ends of the actuator arms 18. The individual head suspension 19 extends forward from the tip end of the actuator arm 18. A flying head slider 21 is supported on the front end of the head suspension 19. The flying head sliders 21 are in this manner connected to the actuator block 16. The flying head sliders 21 are opposed to the surfaces of the magnetic recording disk or disks 13. As conventionally known, in the case where two or more magnetic recording disks 13 are incorporated within the inner space of the main enclosure 12, a pair of the actuator arms 18 as well as a pair of the head suspensions 19 is disposed between the adjacent magnetic recording disks 13.

An electromagnetic transducer, not shown, is mounted on the flying head slider 21. The electromagnetic transducer may include a read element and a write element. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example. The write element may include a thin film magnetic head designed to write magnetic bit data into the magnetic recording disk 13 by utilizing a magnetic field induced at a thin film coil pattern.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a positive pressure or lift on the flying head slider 21. The flying head slider 21 is thus allowed to keep flying above the surface of the magnetic recording disk 13 during the rotation of the magnetic recording disk 13 at a higher stability established by the balance between the urging force of the head suspension 19 and the lift.

A power source such as a voice coil motor (VCM) 22 is connected to the actuator block 16. The power source 22 is designed to drive the actuator block 16 for rotation around the support shaft 17. The rotation of the actuator block 16 induces the swinging movement of the actuator arms 18 and the head suspensions 19. When the actuator arm 18 is driven to swing about the support shaft 17 during the flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13.

A first shroud 23 is formed on the bottom plate of the main enclosure 12 at a location outside the magnetic recording disks 13 so as to stand from the bottom plate. The first shroud 23 is designed to define a shroud surface 25 along a predetermined cylindrical space 24. The axis of the symmetry of the cylindrical space 24 corresponds to the rotation axis of the magnetic recording disks 13. The shroud surface 25 of the first shroud 23 is therefore designed to face the peripheral end surfaces 13a of the magnetic recording disks 13 at a constant distance. The first shroud 23 breaks at a range of the swinging movement of the head actuator 15. The first shroud 23 may be molded for integral formation with the main enclosure 12, for example.

A guiding wall 26 is connected to the downstream end of the first shroud 23. This guiding wall 26 is designed to get remoter from the peripheral end surfaces 13a of the magnetic recording disks 13 at locations further downstream from the first shroud 23 in the direction of the rotation of the magnetic recording disks 13. The guiding wall 26 may extend in the tangential direction of the magnetic recording disks 13, for example. The guiding wall 26 is connected to an inside surface 27 of the main enclosure 12. This inside surface 27 is designed to face the VCM 22. When the airflow is generated during the rotation of the magnetic recording disks 13, the airflow is introduced toward the VCM 22 along the inside surface 27 from the guiding wall 26.

The shroud surface 25 of the first shroud 23, the surface of the guiding wall 26 and the inside surface 27 of the main enclosure 12 are finely finished or smoothened. Machining process or grinding process may be employed. The airflow generated during the rotation of the magnetic recording disks 13 can smoothly flow along the shroud surface 25, the surface of the guiding wall 26, and the inside surface 27. Electropainting may be effected on the shroud surface 25, the surface of the guiding wall 26 and the inside surface 27. The electropainting serves to prevent generation of a dust within the main enclosure 12.

A one-piece component 28 is also disposed at a location outside the magnetic recording disks 13. The one-piece component 28 is located downstream of the first shroud 23 and upstream of the head actuator 15. The one-piece component 28 includes an attachment base 29 fixed to the bottom plate of the main enclosure 12. The attachment base 29 may be screwed on the bottom plate of the main enclosure 12, for example.

The one-piece component 28 includes rectifier plates 31. The rectifier plates 31 extend in the horizontal direction from the attachment base 29 toward the rotation axis of the magnetic recording disks 13. The rectifier plates 31 get into the aforementioned cylindrical space 24 so as to reach locations inside the cylindrical space 24. The surfaces of the individual rectifier plates 31 are thus opposed to the front and back surfaces of the individual recording disks 13 at a certain distance. A single one of the rectifier plates 31 may be located between the adjacent magnetic recording disks 13. When airflow is generated during the rotation of the magnetic recording disks 13, the rectifier plates 31 serve to suppress turbulence of the airflow.

Figure 2:
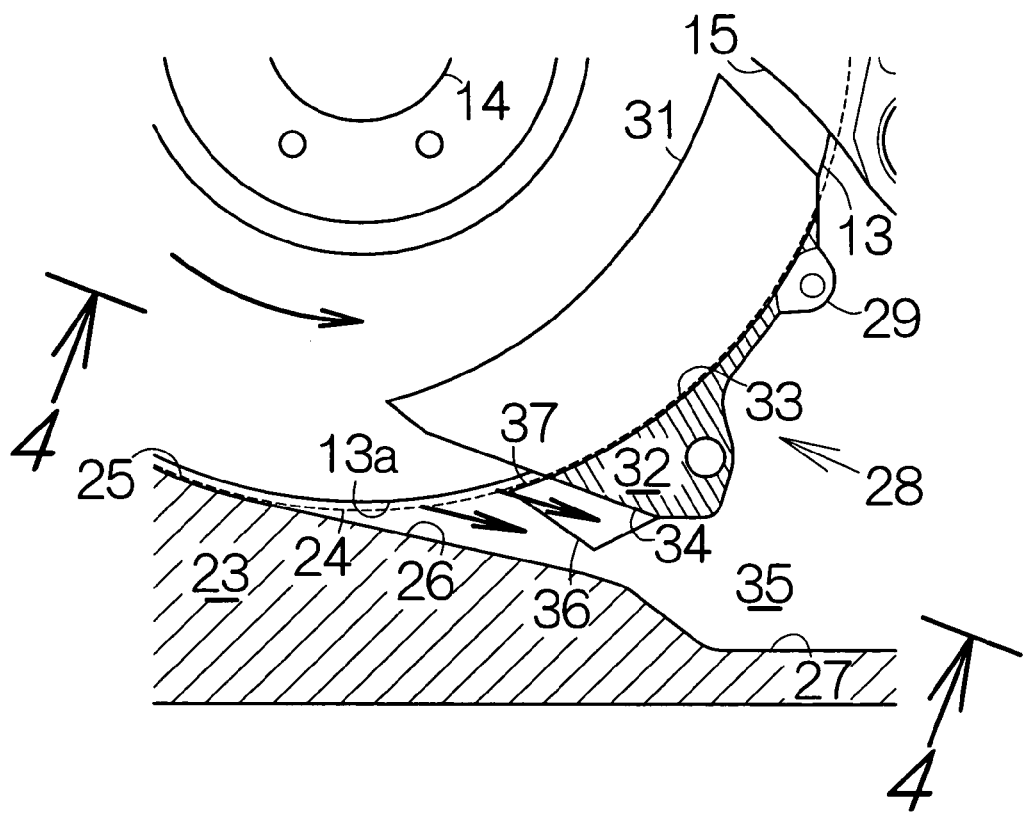
FIG. 2 is a sectional view of a one-piece component for schematically illustrating the structure of the component.

As shown in FIG. 2, a second shroud 32 is formed in the attachment base 29. The second shroud 32 is spaced downstream from the first shroud 23 in the direction of the rotation of the magnetic recording disks 13. The second shroud 32 is designed to define a shroud surface 33 along the cylindrical space 24. The shroud surface 33 is thus opposed to the peripheral end surfaces 13a of the magnetic recording disks 13 at a certain constant distance.

An auxiliary guiding wall 34 is also formed in the attachment base 29. The auxiliary guiding wall 34 is connected to the upstream end of the second shroud 32. The auxiliary guiding wall 34 is designed to face the aforementioned guiding wall 26 at a certain distance. The guiding wall 26 and the auxiliary guiding wall 34 define in this manner an entrance of an air passage 35 extending toward a heating component such as the VCM 22.

Figure 3:
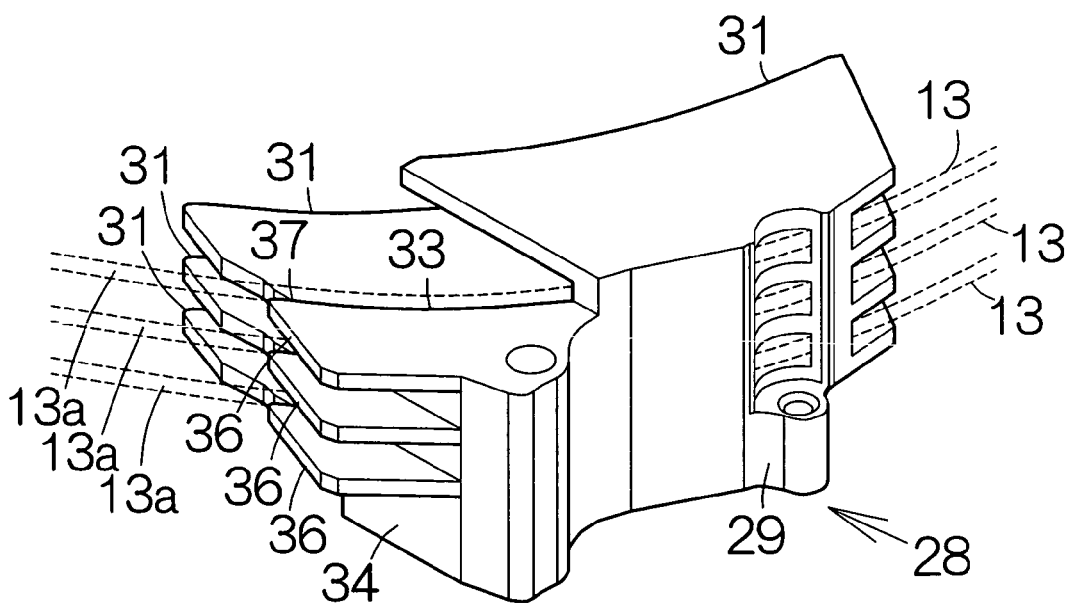
FIG. 3 is an enlarged perspective view of the one-piece component, for schematically illustrating the structure of the component.

Referring to FIG. 3, shroud plates 36 are connected to the auxiliary guiding wall 34. The shroud plates 36 extend along a virtual plane perpendicular to the rotation axis of the magnetic recording disks 13. The individual shroud plate 36 is designed to define the end surface 37 along the cylindrical space 24. The end surface 37 is thus opposed to the peripheral end surface 13a of the corresponding magnetic recording disk 13 at a certain constant distance. The end surfaces 37 are smoothly connected to the shroud surface 33 of the second shroud 32.

Figure 4:
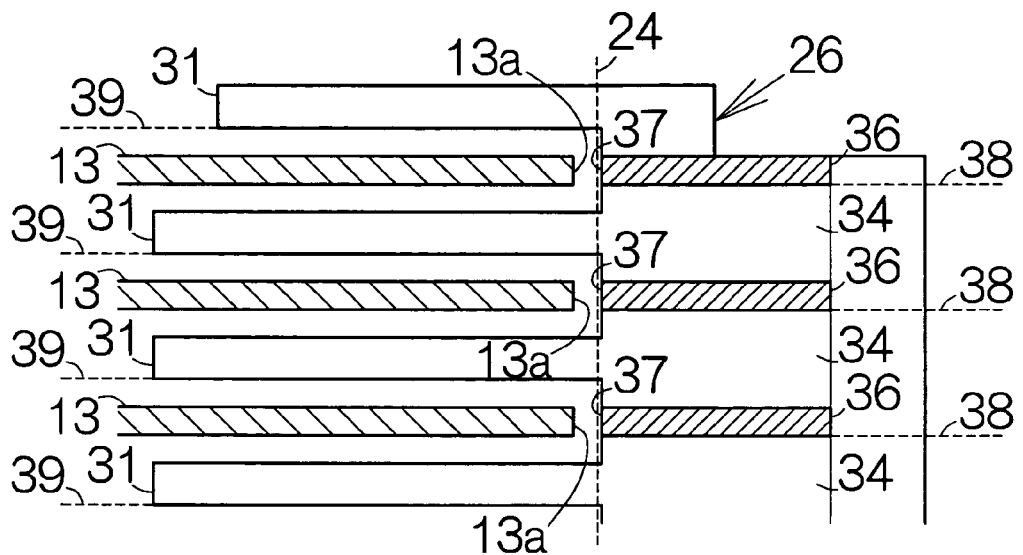
FIG. 4 is a sectional view of the one-piece component, taken along the line 4-4 in FIG. 2, for schematically illustrating the relationship between the component and a magnetic recording disk.

As is apparent from FIG. 4, the individual shroud plate 36 extends along a corresponding one of first virtual planes 38. Here, the individual magnetic recording disk 13 is designed to extend along the first virtual plane 38. The thickness of the shroud plate 36 corresponds to that of the magnetic recording disk 13. Alternatively, the thickness of the shroud plate 36 may be set larger than that of the magnetic recording disk 13. On the other hand, the individual rectifier plate 31 extends along a corresponding one of second planes 39 parallel to the first virtual planes 38. A certain space is set between the first and second virtual planes 38, 39. The single one of the shroud plate 36 may be located between the adjacent rectifier plates 31.

Airflow is generated along the rotating magnetic recording disks 13 in the aforementioned HDD 11. The airflow flows toward the outer periphery of the magnetic recording disks 13 due to the centrifugal force of the magnetic recording disks 13. The end surface 37 of the individual shroud plate 36 faces the peripheral end surface 13a of the corresponding magnetic recording disk 13 at a certain constant distance at a location between the first and second shrouds 23, 32. The end surfaces 37 function as a shroud surface. The end surfaces 37 serve to suppress turbulence of the airflow. Vibration of the magnetic recording disks 13 can be suppressed.

Moreover, when airflow is generated along the rotating magnetic recording disks 13, the airflow is allowed to flow along the shroud surface 25 and the guiding wall 26. The induced airflow flows into the air passage 35 from the entrance defined between the guiding wall 26 and the auxiliary guiding wall 34. Since the shroud plates 36 and the magnetic recording disks 13 extend along the first virtual planes 38 at the entrance of the air passage 35, the airflow can be prevented from staying at the entrance. A large amount of the airflow is allowed to flow into the air passage 35. A large amount of the airflow can be applied to the VCM 22. The flow of the airflow serves to suppress an increase in temperature in the heating component such as the VCM 22. The airflow can effectively be utilized.

The attachment base 29, the rectifier plates 31, the second shroud 32 and the shroud plates 36 can be formed as the one-piece component 28. The one-piece component 28 may be made of a metal material such as aluminum or stainless steel. Molding process may be employed to form the one-piece component 28. The integration of the attachment base 29, the rectifier plates 31, the second shroud 32 and the shroud plates 36 as one component serves to improve efficiency of an assembling process of the HDD 11.

The inventors have examined the effect of the aforementioned shroud plates 36. The inventors prepared the HDD 11 according to an example of the present invention. The inventors also prepared a comparative example according to a conventional HDD. No shroud plates 36 were formed in a component incorporated in the comparative example. The flying head sliders were opposed to the front and back surfaces of the individual magnetic recording disks. The electromagnetic transducers on the flying head sliders read out information from the magnetic recording disks during the rotation of the magnetic recording disks. Frequency characteristics of the vibration were analyzed based on the information read from the magnetic recording disks.

Figure 5:
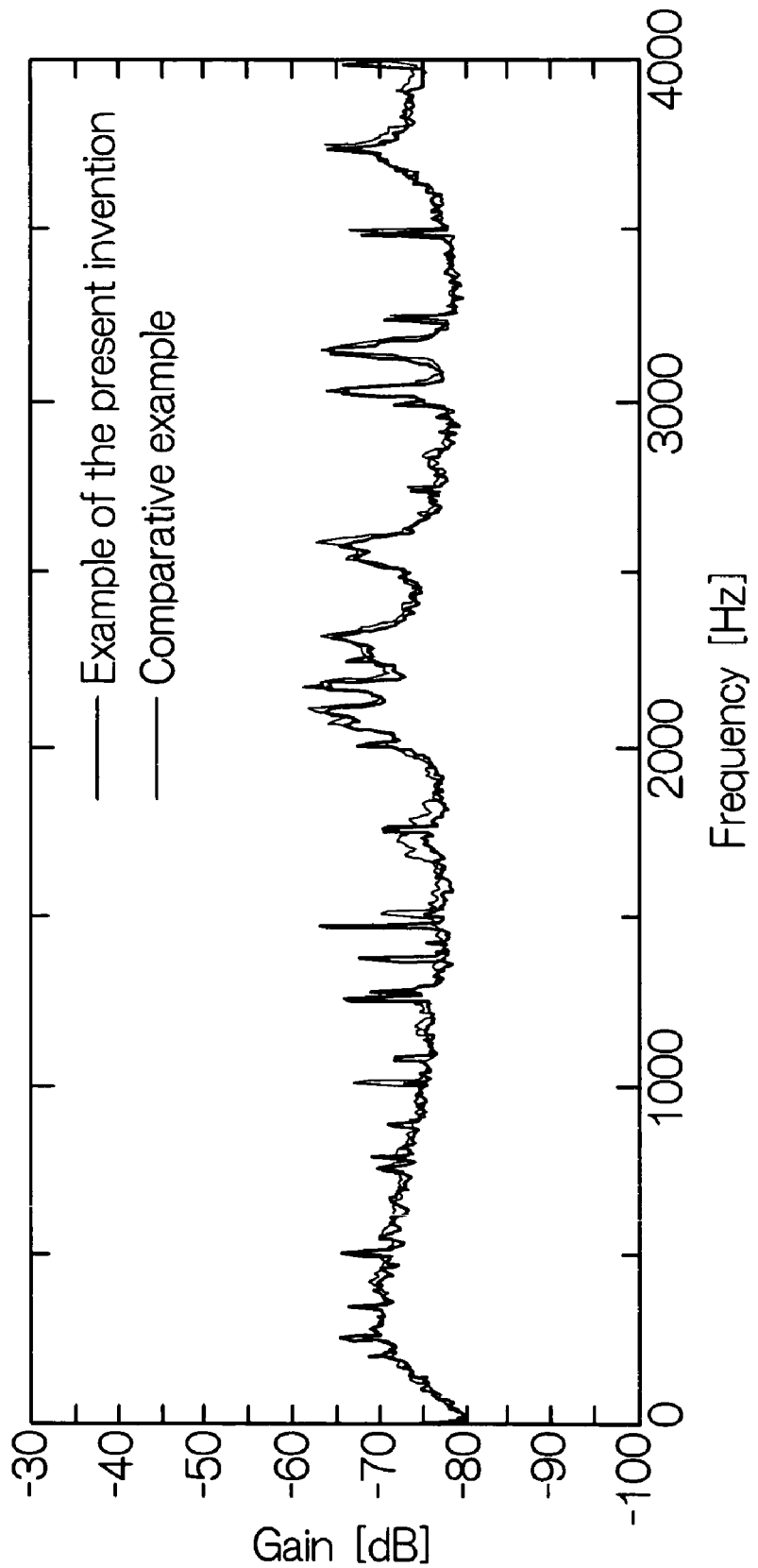
FIG. 5 is a graph showing the frequency characteristics.

FIG. 5 shows the frequency characteristics of the vibration of the magnetic recording disks 13. A decrease of 2-3 [dB] has been observed in the gain of the frequency for the example of the present invention as compared with the comparative example. In particular, it has been proven that the decrease of the gain could be observed over the range of the frequency between 2,000 [Hz] and 3,000 [Hz]. This frequency was considered representative of the vibration of the magnetic recording disks 13. It has been confirmed that the shroud plates 36 serve to suppress the vibration of the magnetic recording disks 13 in the HDD 11. Sway of the flying head sliders 21 relative to the magnetic recording disks 13 has thus been suppressed in the HDD 11. Furthermore, it has been proven that the gain could be suppressed at frequency ranges below 2,000 [Hz] and above 3,000 [Hz].

Figure 6:
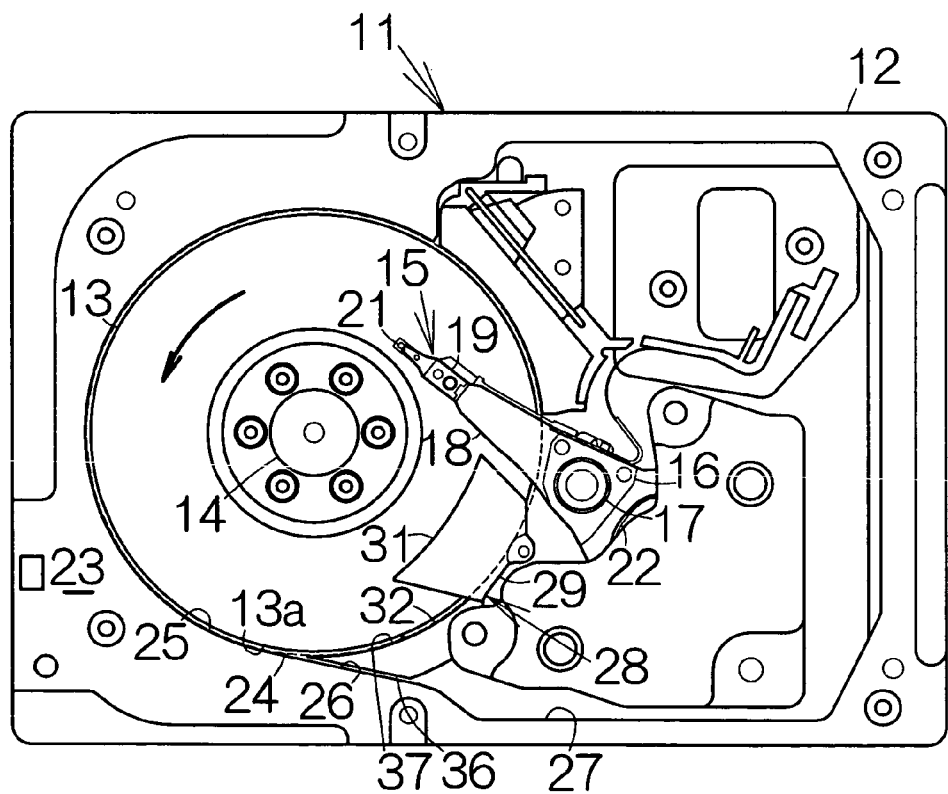
FIG. 6 is a plan view schematically illustrating the structure of a HDD as another example of a recording disk drive according to a modified embodiment of the present invention.

As shown in FIG. 6, it is desirable to locate the shroud plates 36 as closer to the first shroud 23 as possible in the HDD 11, for example. A continuous surface with a reduced gap or without a gap can be established over the first shroud 23, the shroud plates 36 and the second shroud 32. The end surfaces 37 in this manner still further improves the function of the shroud surface. Vibration of the magnetic recording disks 13 can further be suppressed.

A one-piece component may comprise the attachment base 29, the rectifier plates 31 and the second shroud 32, without the shroud plates 36. The shroud plates 36 may be separated from the one-piece component 28. In this case, the shroud plates 36 may be fixed or attached to the main enclosure 12, the cover, the attachment base 29, the rectifier plates 31 or the second shroud 32. A coupling means such as a double-sided adhesive tape, a screw, or the like may be employed for fixation or attachment.

The shroud plates 36 of this type may be positioned at a higher accuracy through the contact against the main enclosure 12, the cover or the one-piece component 28. Alternatively, the shroud plates 36 may be positioned in the main enclosure 12 with a pin or pins standing from the main enclosure 12. Otherwise, a pin or pins formed on the shroud plates 36 may be inserted into a hole or holes defined in the main enclosure 12 or the cover. The alignment of the shroud plates 36 can thus easily be realized in the main enclosure 12.

The shroud plates 36 separate from the one-piece component 28 may likewise be made of a metal material such as aluminum or stainless steel. Molding process may also be employed to form the shroud plates 36. Alternatively, grinding process or MIM (Metal Injection Molding) process may be employed to form the shroud plates 36. Otherwise, the shroud plates 36 may be made of a resin material, for example. The resin material serves to widen the variety of the design as compared with the metal material.

In case where the rectifier plates 31 are separate from the aforementioned one-piece component 28, the shroud plates 36 may be integral to the rectifier plates 31. Otherwise, the shroud plates 36 may be integral to the main enclosure 12 or the cover, a cover of the VCM 22.

What is claimed is:

1. A recording disk drive comprising:
    a recording disk;
    an actuator arm extending over a surface of the recording disk and supporting a head slider;
    a first shroud having a shroud surface defined along a cylindrical space coaxial to a rotation axis of the recording disk, the shroud surface opposed to a peripheral end surface of the recording disk at a certain constant distance;
    a guiding wall connected to the first shroud, said guiding wall getting farther from the peripheral end surface of the recording disk at locations further downstream from the first shroud in a direction of rotation of the recording disk;
    a second shroud having a shroud surface defined along a cylindrical space coaxial to the rotation axis of the recording disk, the shroud surface opposed to the peripheral end surface of the recording disk at a certain constant distance, said second shroud being spaced downstream from the first shroud in the direction of rotation of the recording disk, said second shroud being spaced upstream from the actuator arm;
    an auxiliary guiding wall connected to the second shroud, said auxiliary guiding wall opposed to the guiding wall; and
    a shroud plate cantilevering from the auxiliary guiding wall toward the guiding wall, the shroud plate having between the guiding wall and the auxiliary guiding wall an end surface defined along a cylindrical space coaxial to the rotation axis of the recording disk, the end surface opposed to the peripheral end surface of the recording disk at a certain constant distance at a location downstream of the first shroud and upstream of the second shroud, the end surface being spaced upstream from the actuator arm, said shroud plate extending along a virtual plane perpendicular to the rotation axis of the recording disk.

2. The recording disk drive according to claim 1, wherein a rectifier plate is fixed to the second shroud so as to face at least one of front and back surfaces of the recording disk at a certain distance.

3. The recording disk drive according to claim 2, wherein the second shroud, the shroud plate and the rectifier plate form a one-piece component.

4. The recording disk drive according to claim 1, wherein the guiding wall and the auxiliary guiding wall are configured to define an entrance of an air passage extending toward a heating component.

5. A one-piece component for a recording disk drive, comprising:
    an attachment base fixed to an enclosure of the recording disk drive;
    a shroud configured to define a shroud surface along a predetermined cylindrical space coaxial to a rotation axis of a recording disk;
    an auxiliary guiding wall defined in the attachment base outside the cylindrical space, said auxiliary guiding wall opposed to a guiding wall on the enclosure so as to define an entrance of an air passage extending toward a heating component;
    a shroud plate extending along a first plane perpendicular to an axis of the cylindrical space, shroud plate cantilevering from the auxiliary guiding wall toward the guiding wall, said shroud plate defining a peripheral end surface along the cylindrical space between the guiding wall and the auxiliary guiding wall; and
    a rectifier plate extending along a second plane parallel to the first plane, said rectifier plate getting into the cylindrical space.

6. The one-piece component for a recording disk drive according to claim 5, wherein the peripheral end surface of the shroud plate is continuous with the shroud surface of the shroud.

* * * * *